US012712413B2

(12) United States Patent
Liang

(10) Patent No.: US 12,712,413 B2
(45) Date of Patent: Aug. 18, 2026

(54) ANTI-LOOSE BOLT CONNECTION STRUCTURE FOR JUNCTION BOX

(71) Applicant: Schaeffler Technologies AG & Co. KG, Herzogenaurach (DE)

(72) Inventor: Junyi Liang, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 185 days.

(21) Appl. No.: 18/289,306

(22) PCT Filed: May 8, 2021

(86) PCT No.: PCT/CN2021/092424
§ 371 (c)(1),
(2) Date: Nov. 2, 2023

(87) PCT Pub. No.: WO2022/236483
PCT Pub. Date: Nov. 17, 2022

(65) Prior Publication Data

US 2024/0364179 A1 Oct. 31, 2024

(51) Int. Cl.
*H02G 3/08* (2006.01)
*F16B 39/10* (2006.01)
*H02K 5/22* (2006.01)

(52) U.S. Cl.
CPC ............. *H02K 5/225* (2013.01); *F16B 39/10* (2013.01); *H02G 3/08* (2013.01)

(58) Field of Classification Search
CPC ..... H02K 5/225; F16B 39/10; F16B 2200/93; H02G 3/08
See application file for complete search history.

(56) References Cited

U.S. PATENT DOCUMENTS 3,855,570 A 12/1974 Fischer
5,964,559 A 10/1999 Larimore et al.
2010/0040431 A1* 2/2010 Suzuki .................. H05K 7/026 411/166

FOREIGN PATENT DOCUMENTS

CA 1287992 C 8/1991
CN 101557088 A 10/2009
CN 201656654 U 11/2010
CN 207200467 U 4/2018
CN 209705052 U 11/2019
(Continued)

OTHER PUBLICATIONS

China Patent Office, Office Action for Chinese Application No. CN202180096785.5 dated May 16, 2026, 15 pages (with translation).

(Continued)

*Primary Examiner* — Sherman Ng
(74) *Attorney, Agent, or Firm* — Suiter Swantz IP

(57) ABSTRACT

An anti-loose bolt connection structure for a junction box, comprising: a junction box main body; a first terminals disposed on the junction box main body, the first terminals being provided with a threaded hole; a second terminal for electrically connecting to the first terminals, the second terminal being provided with a through hole; a bolt which each comprise having a bolt head portion; and an anti-loose assembly mounted on the junction box main body, the anti-loose assembly being cooperatively mounted with the bolt head portion for limiting the rotation of the bolt.

20 Claims, 5 Drawing Sheets

(56) References Cited

FOREIGN PATENT DOCUMENTS

| | | | |
|---|---|---|---|
| CN | 211858953 | U | 11/2020 |
| IL | 130739 | B | 5/2004 |
| JP | 2015047970 | A | 3/2015 |

OTHER PUBLICATIONS

China Patent Office, Search Report for Chinese Patent Application No. 2021800967855 dated May 14, 2026, 5 pages (with translation).

* cited by examiner

ANTI-LOOSE BOLT CONNECTION STRUCTURE FOR JUNCTION BOX

CROSS-REFERENCE TO RELATED APPLICATIONS

This application is the U.S. National Phase of PCT Appln. No. PCT/CN2021/092424 filed May 8, 2021, the entire disclosure of which is incorporated by reference herein.

TECHNICAL FIELD

The present application relates to an anti-loose structure for wiring terminals of a junction box, and in particular, to an anti-loose bolt connection structure for a junction box.

BACKGROUND

In electric vehicles, for a P2 module or other structure that requires a three-phase high voltage (HV) junction box, one possible design is to fix a three-phase high voltage wiring terminal to a busbar terminal by bolts.

In the life cycle of the electric vehicle, the bolt may become loose due to continued exposure to vibration environment. Especially for a high voltage motor, the loosening of the three-phase high voltage wiring terminal from the busbar terminal will lead to serious consequences, for example, electric arc is generated between the three-phase wiring terminal and the busbar terminal, which will damage the busbar terminal and cause a motor failure.

SUMMARY

The present application overcomes or at least alleviates the above deficiencies of the prior art and provides an anti-loose bolt connection structure for a junction box.

The present application provides, according to an exemplary embodiment, an anti-loose bolt connection structure for a junction box, comprising:

- a junction box main body;
- first terminals disposed on the junction box main body, the first terminals being provided with a threaded hole;
- second terminals for electrically connecting to the first terminals, the second terminals being provided with a through hole;
- bolts, which each comprise a bolt head portion; and
- anti-loose assemblies mounted on the junction box main body, the anti-loose assemblies being cooperatively mounted with the bolt head portions for limiting the rotation of the bolts.

In embodiments, the bolt head portion has a non-circular shape;

- the anti-loose assemblies comprise an anti-loose plate, the anti-loose plate being mounted on the junction box main body and having bolt locking holes, and the bolt locking hole has a non-circular shape and is adapted to the shape of the bolt head portion to prevent the rotation of the bolt.

In embodiments, the anti-loose plate is rotatably mounted on the junction box main body; the bolts are capable of being tightened or unscrewed in a first state where the anti-loose plate is away from the bolts; and the bolt locking holes of the anti-loose plate prevent the rotation of the bolts in a second state where the anti-loose plate rotates relative to the junction box main body such that the bolt locking holes are sleeved on the bolt head portions.

In embodiments, in the second state, the anti-loose plate is clamped to and/or connected via screws to the junction box main body.

In embodiments, the anti-loose plate exhibits non-conductivity or is made of an electrically non-conductive material.

In embodiments, the bolt head portion has a slot or through hole;

- the anti-loose assemblies comprise locking pins, the locking pin extending into the slot or through hole to prevent the rotation of the bolt.

In embodiments, the anti-loose assemblies further comprise locking pin fixing portions disposed on the junction box main body, and one end of the locking pin is connected to the locking pin fixing portion such that the locking pin is connected to the junction box main body.

In embodiments, the locking pin comprises;

- a locking pin head portion connected to the locking pin fixing portion; a locking slot; and
- a step formed between the locking pin head portion and the locking slot, the bolt head portion being clamped with the step to prevent the locking pin from being separated from the locking pin fixing portion.

In embodiments, the locking slot is formed such that when the bolt rotates in an unscrewing direction, a side wall of the slot or through hole of the bolt head portion presses against a bottom wall of the locking slot, and the bolt head portion is clamped with the step.

In embodiments, the locking pin exhibits non-conductivity or is made of an electrically non-conductive material.

The anti-loose bolt connection structure for a junction box according to the present application can well prevent the rotation of the bolts, thus preventing the bolts from loosening and guaranteeing the reliable connection between the first terminals and the second terminals.

DETAILED DESCRIPTION

Exemplary embodiments of the present application are described below with reference to the accompanying drawings.

Figure 1:
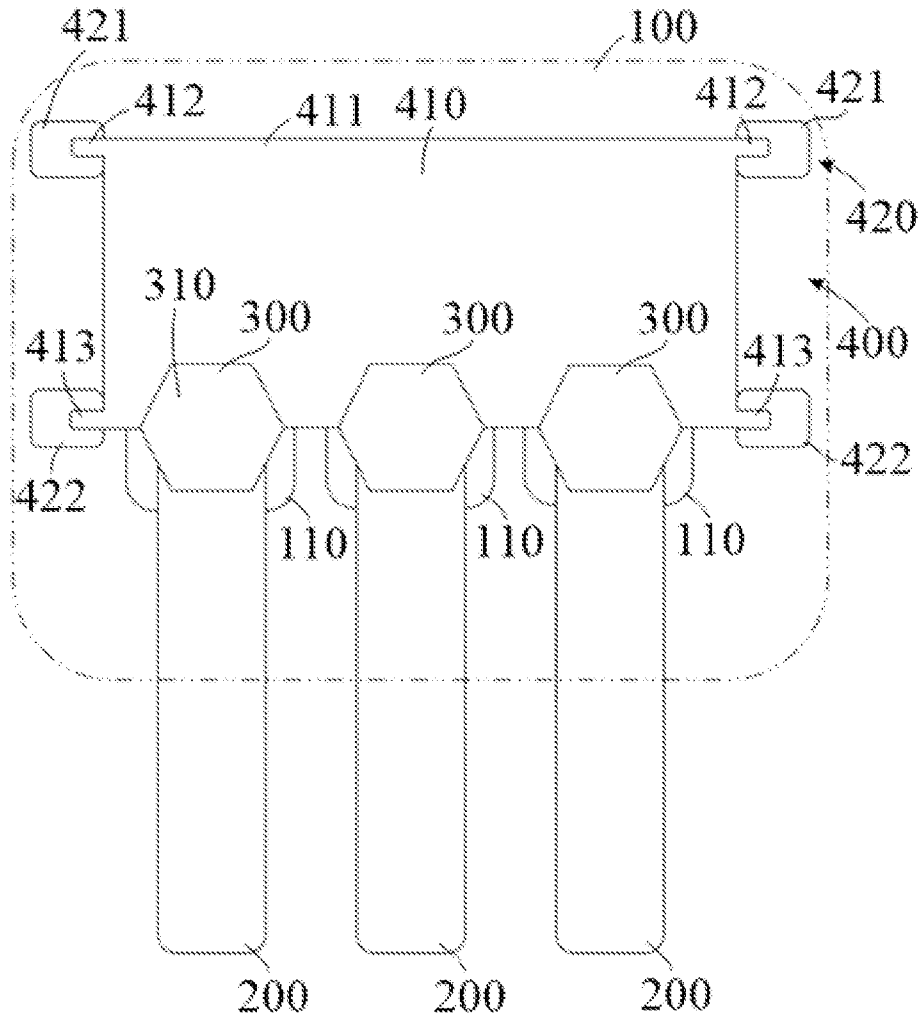
FIG. 1 illustrates a schematic diagram of a first embodiment of an anti-loose bolt connection structure for a junction box according to the present application.
Figure 2:
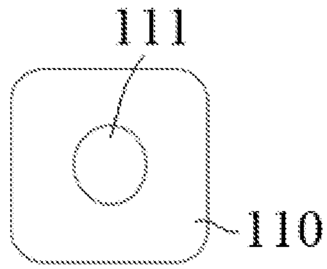
FIG. 2 illustrates a top view of a first terminal.
Figure 3:
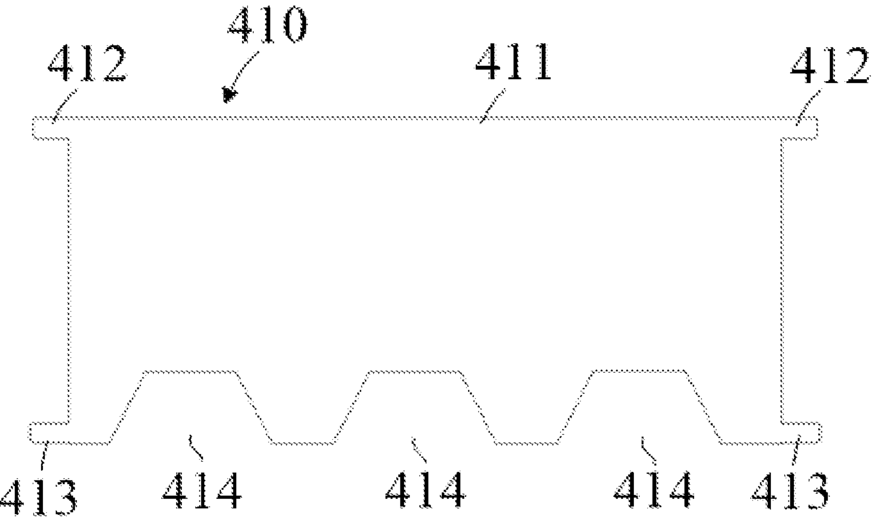
FIG. 3 illustrates a structural schematic diagram of an anti-loose plate according to the first embodiment of the present application.

FIG. 1 illustrates a schematic diagram of a first embodiment of an anti-loose bolt connection structure for a junction box according to the present application. FIG. 2 illustrates a top view of a first terminal. FIG. 3 illustrates a structural schematic diagram of an anti-loose plate according to the first embodiment of the present application.

The first embodiment of the anti-loose bolt connection structure for a junction box according to the present application is described below with reference to FIG. 1 to FIG. 3.

The anti-loose bolt connection structure for a junction box comprises: a junction box main body 100; first terminals 110 disposed on the junction box main body 100, the first terminals 110 being provided with a threaded hole 111 (the top view of the first terminal 110 is as shown in FIG. 2); second terminals 200 for electrically connecting to the first terminals 110, the second terminals 200 being provided with a through hole; bolts 300, which each comprise a bolt head portion 310; and anti-loose assemblies 400 mounted on the junction box main body 100, the anti-loose assemblies 400 being cooperatively mounted with the bolt head portions 310 for limiting the rotation of the bolts 300.

The bolt 300 may comprise a screw portion 320 (see FIG. 6); the screw portion 320 may be inserted into the through hole of the second terminal 200 and is in threaded connection to the threaded hole 111 of the first terminal 110, thereby connecting the first terminal 110 with the second terminal 200.

The bolt head portion 310 has a non-circular shape. As shown in FIG. 1, the bolt head portion 310 is in the shape of a regular hexagon.

The anti-loose assemblies 400 may comprise an anti-loose plate 410, the anti-loose plate 410 being mounted on the junction box main body 100 and having bolt locking holes 414 (see FIG. 3), and the bolt locking hole 414 has a shape adapted to the shape of the bolt head portion 310, thereby preventing the rotation of the bolt 300. In the illustrated example, the bolt head portion 310 is in the shape of a regular hexagon, and the shape of the bolt locking hole 414 is half of the regular hexagon, including three adjoining edges of the regular hexagon, which is just right for the bolt head portion 310 to be stuck into the bolt locking hole 414 with three edges of the bolt locking hole 414 adapted to three edges of the bolt head portion 310, thereby getting the bolt head portion 310 stuck into the bolt locking hole 414, preventing the rotation of the bolt head portion 310/bolt 300 and achieving the purpose of preventing the loosening of the bolt 300.

Although the bolt head portions 310 are shown in the shape of the regular hexagon in the accompanying drawings of the present application, the present application it not limited thereto, and the objective of the present application can be achieved as long as the bolt head portions are not in the circular shape.

FIG. 3 illustrates a structural schematic diagram of the anti-loose plate 410.

The anti-loose plate 410 may be rotatably mounted on the junction box main body 100. In a first state where the anti-loose plate 410 is away from the bolts 300, the bolts are not limited by the bolt locking holes 414 so that the bolts 300 can be tightened or unscrewed; the bolt locking holes 414 prevent the rotation of the bolts 300 in a second state where the anti-loose plate 410 rotates relative to the junction box main body 100 such that the bolt locking holes 414 are sleeved on the bolt head portions 310.

FIG. 1 illustrates the second state where the bolt locking holes 414 of the anti-loose plate 410 are sleeved on the bolt head portions 310. It will be understood that the bolt locking holes 414 are not limited to the illustrated half hexagonal shape including three edges and may also be in a shape more than half of the hexagonal shape or in a complete hexagonal shape.

Here, "the bolt locking holes are sleeved on the bolt head portions" includes not only that the bolt locking holes surround the bolt head portions completely in the circumferential direction but also that the bolt locking holes surround the bolt head portions in a partial region or range in the circumferential direction.

In this embodiment, there are three bolts 300, and three bolt locking holes 414 corresponding thereto are disposed in the anti-loose plate 410. As a matter of course, the present application is not limited thereto.

The anti-loose plate 410 may comprise an anti-loose plate main body 411, and first protrusions 412 and second protrusions 413 formed at two side ends thereof. In the illustrated example, four protrusions 412, 413 are formed at four corners of the rectangular anti-loose plate 410 (or the anti-loose plate main body 411). Correspondingly, the junction box main body 100 may comprise first groove structures 421 and second groove structures 422. The first groove structures 421 and the second groove structures 422 may be referred to as anti-loose plate fixing structures 420. Here, the anti-loose plate fixing structures 420 may further comprise or additionally comprise screws and the like.

The first protrusion 412 may be of a rotating shaft structure and clamped into the first groove structure 421 of the junction box main body 100. The two first protrusions 412 at the top of FIG. 1 are typically clamped into the first groove structures 421 of the junction box main body 100 and are not prone to being disengaged from the junction box main body 100. In the second state, the anti-loose plate 410 may be clamped into the second groove structures 422 on the junction box main body 100 through the second protrusion 413 such that the anti-loose plate 410 is fixed. When the anti-loose plate 410 returns to the first state from the second state, the anti-loose plate 410 rotates around the two first protrusions 412 such that the bolt locking holes 414 of the anti-loose plate 410 are disengaged from the bolt head portions 310.

Moreover, the anti-loose plate 410 may also or additionally be connected to the junction box main body 100 by screws (not shown), for example, holes for the screws to pass through are formed between the bolt locking holes 414 of the anti-loose plate 410, and the screws pass through the holes and are in threaded connection to the junction box main body 100. The positions of the holes for the screws to pass through are not unique, and the holes for the screws to pass through may be disposed in the anti-loose plate 410 at any positions as long as the anti-loose plate 410 can be fixed to the junction box main body 100.

The anti-loose plate 410 may be made of an electrically non-conductive material such as plastics. Here, "the anti-loose plate is made of an electrically non-conductive material" includes that the anti-loose plate is completely made of an electrically non-conductive material and also that the anti-loose plate is mainly made of an electrically non-conductive material such that the anti-loose plate (the surface of the anti-loose plate) finally exhibits non-conductivity.

In the first embodiment, the design and the mounting manner of the anti-loose plate 410 are as follows.

Bolts 300 (hexagon bolts, other polygonal bolts and bolts having non-circular bolt head portions may be used) of a fixed size are selected.

An anti-loose plate 410 for the bolts 300 described above is designed and manufactured.

The anti-loose plate 410 is adapted to the shape of an HV junction box and designed to be of roughly rectangular shape with three bolt locking holes 414 corresponding to three bolts 300.

The anti-loose plate 410 is provided with two first protrusions 412 and two second protrusions 413 at four corners thereof.

First groove structures 421 corresponding to the first protrusions 412 and second groove structures 422 corresponding to the second protrusions 413 are designed, and the first groove structures 421 and the second groove structures 422 are fixed in the HV junction box.

The first terminals 110 and the second terminals 200 are connected using the bolts 300, the first terminals 110 and the second terminals 200 may be three-phase high voltage (HV) busbar terminals and wiring terminals, respectively, and the bolts 300 are tightened using a correct torque.

The anti-loose plate 4 is mounted into the groove structures of the HV junction box.

Firstly, the two first protrusions 412 are mounted into the two first groove structures 421, and this design allows the anti-loose plate 410 to rotate around the two first protrusions 412 thereby enabling the anti-loose plate 410 to be opened or the anti-loose plate to fasten the bolts 300.

The bolts 300 are adjusted such that the anti-loose plate 410 can fix the bolts 300 through the bolt locking holes 414.

The two second protrusions 413 are assembled into the two second groove structures 422. Thus, the second protrusions 413 are fixed in the second groove structures 422 such that the anti-loose plate 410 is fixed and cannot rotate. The second protrusions 413 may be in interference fit, snap fit and the like with the second groove structures 422.

The bolts 300 are fixed by the anti-loose plate 410 and may not become loose, so the connection of the first terminals 110 and the second terminals 200 is firm and reliable.

Figure 4:
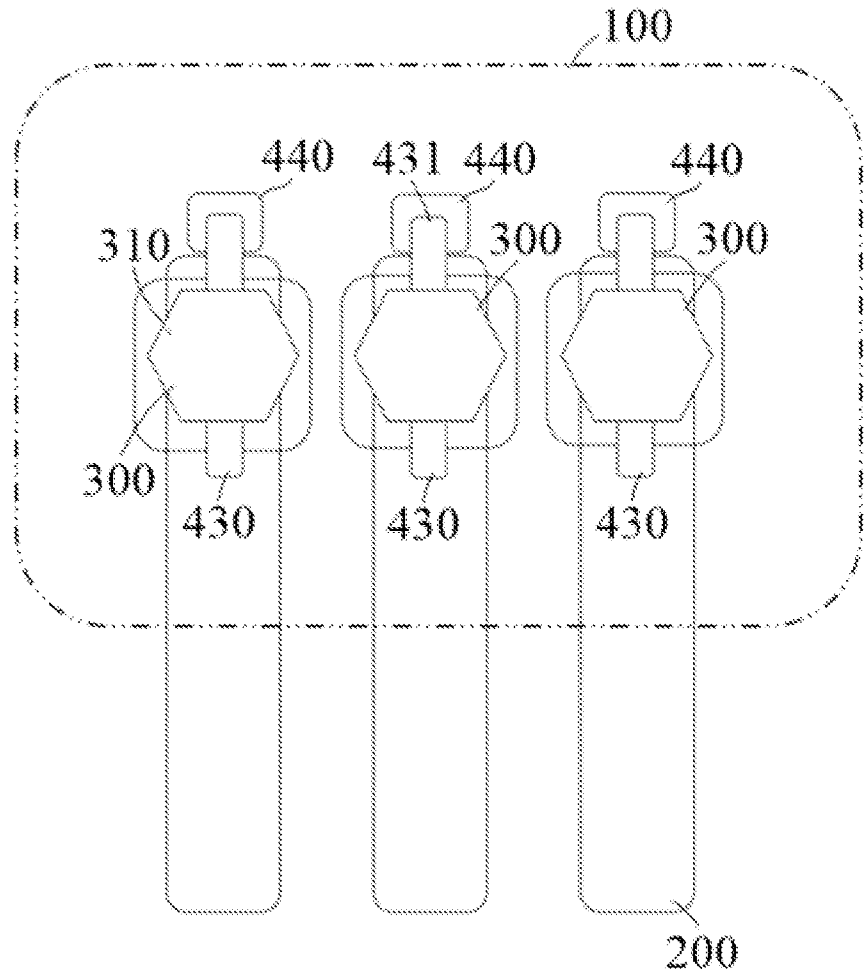
FIG. 4 illustrates a schematic diagram of a second embodiment of an anti-loose bolt connection structure for a junction box according to the present application.
Figure 5:
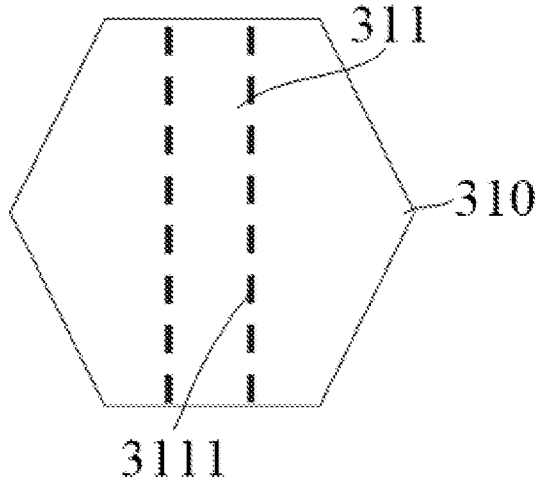
FIG. 5 illustrates a schematic diagram of a bolt head portion according to the second embodiment of the present application.
Figure 6:
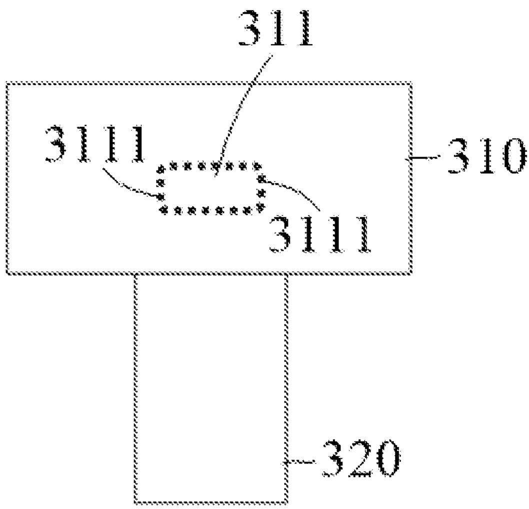
FIG. 6 illustrates a schematic diagram of a bolt according to the second embodiment of the present application.
Figures 7, 8:
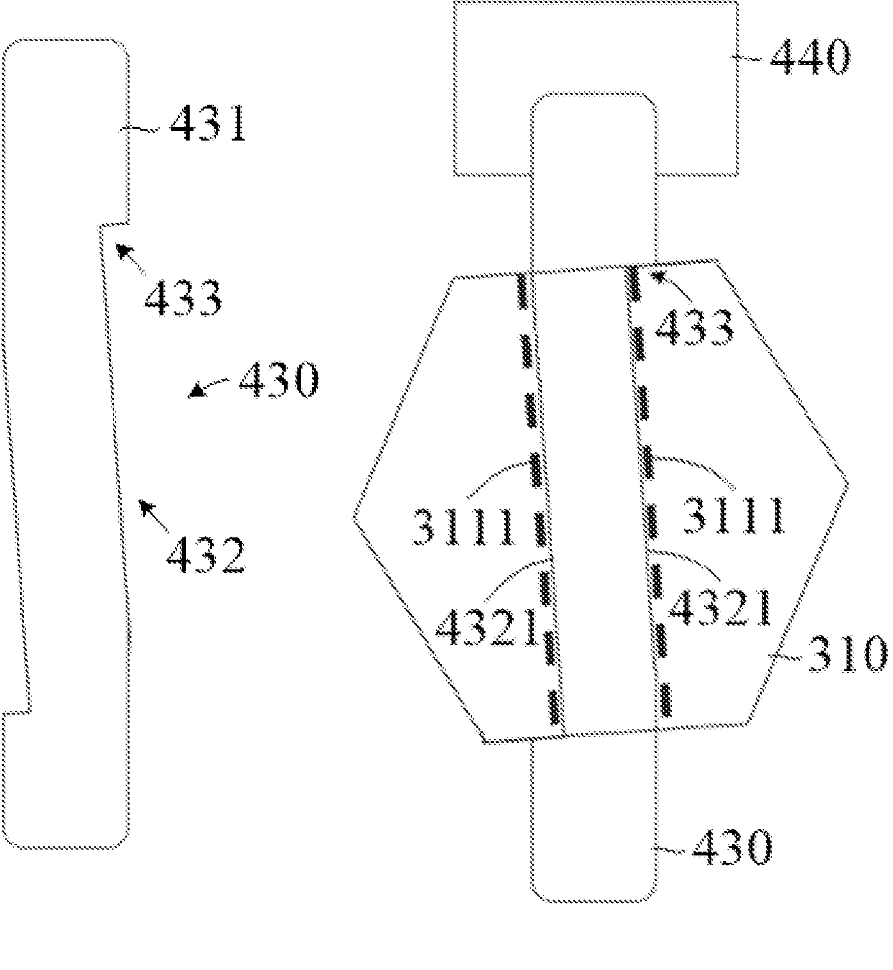
FIG. 7 illustrates a schematic diagram of a locking pin according to the second embodiment of the present application.
FIG. 8 illustrates a schematic diagram of cooperative work of a locking pin, a bolt, and a locking pin fixing portion according to the second embodiment of the present application.

FIG. 4 illustrates a schematic diagram of a second embodiment of an anti-loose bolt connection structure for a junction box according to the present application. FIG. 5 illustrates a schematic diagram of a bolt head portion according to the second embodiment of the present application. FIG. 6 illustrates a schematic diagram of a bolt according to the second embodiment of the present application. FIG. 7 illustrates a schematic diagram of a locking pin according to the second embodiment of the present application. FIG. 8 illustrates a schematic diagram of cooperative work of a locking pin, a bolt, and a locking pin fixing portion according to the second embodiment of the present application.

The second embodiment of the anti-loose bolt connection structure for a junction box according to the present application is described below with reference to FIG. 4 to FIG. 8. The second embodiment differs from the first embodiment mainly in that anti-loose assemblies of a different structure are used.

As shown in FIG. 5 and FIG. 6, the bolt head portion 310 in the second embodiment is specially designed and the bolt head portion 310 is provided with a through hole 311. Although shown in the form of the through hole 311 herein, the through hole 311 may also be replaced by a slot formed in the bolt head portion.

The anti-loose assemblies 400 may comprise locking pins 430, the locking pin 430 extending into the through hole 311 and preventing the rotation of the bolt 300 through the cooperation of the locking pin 430 and the bolt head portion 310.

The anti-loose assemblies 400 may comprise locking pin fixing portions 440) disposed on the junction box main body 100 and one end of the locking pin 430 is connected to the locking pin fixing portion 440 such that the locking pin 430 is connected to the junction box main body 100.

As shown in FIG. 7, the locking pin 430 may comprise: a locking pin head portion 431 connected to the locking pin fixing portion 440; a locking slot 432; and a step 433 formed between the locking pin head portion 431 and the locking slot 432. The bolt head portion 310 is clamped with the step 433 to prevent the locking pin 430 from being separated from the locking pin fixing portion 440 and the bolt head portion 310.

The locking pin head portion 431 of the locking pin 430 is sized to be capable of passing through the through hole 311. The locking slot 432 is formed such that when the bolt 300 rotates in an unscrewing direction (the anti-clockwise direction in FIG. 8), a side wall 3111 of the through hole 311 of the bolt head portion 310 presses against a bottom wall 4321 of the locking slot 432, and an outer peripheral surface of the bolt head portion 310 is clamped with the step 433.

As shown in FIG. 8, the locking pin 430 passes through the through hole 311 in the bolt head portion 310 and the bolt 300 is rotated in the unscrewing direction (the anti-clockwise direction in FIG. 8); thus, the step 433 is stuck in the bolt head portion 310 and the bolt head portion 310 prevents the locking pin 430 from moving downwards in the figure, thereby preventing the locking pin 430 from being separated from the locking pin fixing portion 440 and the bolt head portion 310.

Locking slots 432 and steps 433 may be formed on both two sides of the locking pin 430, as shown in FIG. 7, however, it is also possible that the locking slot 432 and the step 433 are designed on only one side.

When the locking slots 432 and the steps 433 are formed on both two sides of the locking pin 430, the locking pin 430 has a point symmetric structure and any end of the locking pin 430 may be inserted in the process of mounting the locking pin 430 into the through hole 311.

The locking pin 430 may be made of an electrically non-conductive material such as plastics.

In the second embodiment, the mounting manner of the locking pins 430 is as follows.

The bolts 300 are tightened by applying a correct torque, and the first terminals 110 are connected with the second terminals 200.

The bolts 300 are adjusted such that the locking pins 430 pass through the through holes 311, and the locking pins 430 are inserted into the locking pin fixing portions 440.

The locking pin fixing portions 440 impose restrictions on the locking pins 430 and disenable the locking pins to rotate along with the bolts 300. The bolts 300 are adjusted towards the anti-clockwise direction such that the steps 433 are stuck at the bolt head portions 310 to prevent the locking pins 430 from being reversely separated from the bolts 300.

The bolts 300 are fixed by the locking pins 430 and may not become loose and the connection of the first terminals 110 and the second terminals 200 is firm and reliable.

Certainly, the present application is not limited to the above-mentioned embodiments, and those skilled in the art can make various modifications to the above-mentioned embodiments of the present application under the teaching of the present application without departing from the scope of the present application.

The anti-loose bolt connection structure for a junction box of the present application can be used for, but not limited to, a P2 module or other module structure that requires an HV junction box in the field of automobiles. Such a design can enhance the connection reliability of terminals, especially three-phase high voltage wiring terminals and busbar terminals. It can avoid loosening between terminals, especially three-phase high voltage wiring terminals and busbar terminals, thereby avoiding generation of electric arc, damage of terminals, and motor failure caused by the loosening.

LIST OF REFERENCE NUMERALS

100 Junction box main body
110 First terminal
111 Threaded hole
200 Second terminal
300 Bolt
310 Bolt head portion
311 Through hole
400 Anti-loose assembly
410 Anti-loose plate
412 First protrusion
413 Second protrusion
414 Bolt locking hole
421 First groove structure
422 Second groove structure
430 Locking pin
431 Locking pin head portion
432 locking slot
4321 Bottom wall
433 Step
440 Locking pin fixing portion

The invention claimed is:

1. An anti-loose bolt connection structure for a junction box, comprising:
- a junction box main body;
- a first terminal disposed on the junction box main body, the first terminal being provided with a threaded hole;
- a second terminal for electrically connecting to the first terminal, the second terminal being provided with a through hole;
- a bolt having a bolt head portion; and
- an anti-loose assembly mounted on the junction box main body, the anti-loose assembly being cooperatively mounted with the bolt head portion for limiting rotation of the bolt, wherein the bolt head portion has a non-circular shape, wherein the anti-loose assembly includes an anti-loose plate, the anti-loose plate being mounted on the junction box main body and having a bolt locking hole, wherein the bolt locking hole has a non-circular shape and is adapted to a shape of the bolt head portion to prevent rotation of the bolt.

2. The anti-loose bolt connection structure for a junction box according to claim 1, wherein,
- the anti-loose plate is rotatably mounted on the junction box main body, the anti-loose plate being rotatable from a first state in which the anti-loose plate is spaced from the bolt to a second state in which the bolt locking hole is sleeved on the bolt head portion.

3. The anti-loose bolt connection structure for a junction box according to claim 2, wherein,
- the anti-loose plate includes a first protrusion and a second protrusion spaced from each other, the first protrusion being connected to the junction box main body.

4. The anti-loose bolt connection structure for a junction box according to claim 1, wherein,
- the anti-loose plate is made of an electrically non-conductive material.

5. The anti-loose bolt connection structure for a junction box according to claim 1, wherein,
- the bolt head portion has a through hole;
- the anti-loose assembly includes a locking pin, the locking pin extending into the through hole to prevent rotation of the bolt.

6. The anti-loose bolt connection structure for a junction box according to claim 5, wherein,
- the anti-loose assembly further comprises a locking pin fixing portion disposed on the junction box main body, and one end of the locking pin is connected to the locking pin fixing portion such that the locking pin is connected to the junction box main body.

7. The anti-loose bolt connection structure for a junction box according to claim 6, wherein,
- the locking pin includes:
- a locking pin head portion connected to the locking pin fixing portion;
- a locking slot; and
- a step formed between the locking pin head portion and the locking slot,
- the bolt head portion being clamped with the step to prevent the locking pin from being separated from the locking pin fixing portion.

8. The anti-loose bolt connection structure for a junction box according to claim 7, wherein,
- the locking slot is formed such that when the bolt rotates in an unscrewing direction, a side wall of the through hole of the bolt head portion presses against a bottom wall of the locking slot, and the bolt head portion is clamped with the step.

9. The anti-loose bolt connection structure for a junction box according to claim 5, wherein,
- the locking pin is made of an electrically non-conductive material.

10. The anti-loose bolt connection structure for a junction box according to claim 1, wherein,
- the bolt extends through the through hole of the second terminal and is threadedly connected with the threaded hole of the first terminal.

11. The anti-loose bolt connection structure for a junction box according to claim 2, wherein,
- in the first state, the bolt is rotatable relative to the junction box main body; and
- in the second state, the anti-loose plate prevents rotation of the bolt relative to the junction box main body.

12. The anti-loose bolt connection structure for a junction box according to claim 3, wherein,
- in the second state, the second protrusion is connected to the junction box main body such that the anti-loose plate is non-rotatably connected to the junction box main body.

13. The anti-loose bolt connection structure for a junction box according to claim 3, wherein,
- in the first state, the second protrusion is disengaged from the junction box main body such that the anti-loose plate is rotatable about the first protrusion relative to the junction box main body.

14. A method of forming an anti-loose connection structure for a junction box, comprising:
- providing a junction box main body, wherein the junction box main body includes a first terminal having a threaded hole;
- providing a second terminal for electrically connecting to the first terminal, the second terminal including a through hole;
- aligning the through hole with the threaded hole;

inserting a bolt through the through hole;

rotating a bolt head portion of the bolt to threadedly connect the bolt to the first terminal via the threaded hole;

providing an anti-loose assembly, wherein the anti-loose assembly is configured to engage the bolt head portion of the bolt; and connecting the anti-loose assembly to the junction box main body such that the anti-loose assembly prevents rotation of the bolt head portion relative to the junction box main body, wherein the anti-loose assembly includes a plate having a bolt locking hole adapted to a shape of the bolt head portion.

15. The method according to claim 14, wherein the anti-loose assembly is made of an electrically non-conductive material.

16. The method according to claim 14, wherein engaging the bolt head portion includes rotating the anti-loose assembly relative to the junction box main body to sleeve the bolt locking hole on the bolt head portion.

17. The method according to claim 14, wherein the bolt head portion includes a through hole and the anti-loose assembly includes a locking pin.

18. The method according to claim 17, wherein engaging the bolt head portion includes inserting the locking pin through the through hole of the bolt head portion.

19. An anti-loose bolt connection structure for a junction box, comprising:

a junction box main body;

a first terminal disposed on the junction box main body, the first terminal being provided with a threaded hole;

a second terminal for electrically connecting to the first terminal, the second terminal being provided with a through hole;

a bolt having a bolt head portion; and an anti-loose assembly mounted on the junction box main body, the anti-loose assembly being cooperatively mounted with the bolt head portion for limiting rotation of the bolt, wherein the bolt head portion has a through hole, wherein the anti-loose assembly includes a locking pin, the locking pin extending into the through hole to prevent rotation of the bolt.

20. The anti-loose bolt connection structure for a junction box according to claim 19, wherein, the anti-loose assembly further comprises a locking pin fixing portion disposed on the junction box main body, and one end of the locking pin is connected to the locking pin fixing portion such that the locking pin is connected to the junction box main body.

* * * * *